Feb. 7, 1961   M. L. HOOVER ET AL   2,970,664
MINE HAULAGE VEHICLE
Filed June 9, 1958   5 Sheets-Sheet 1
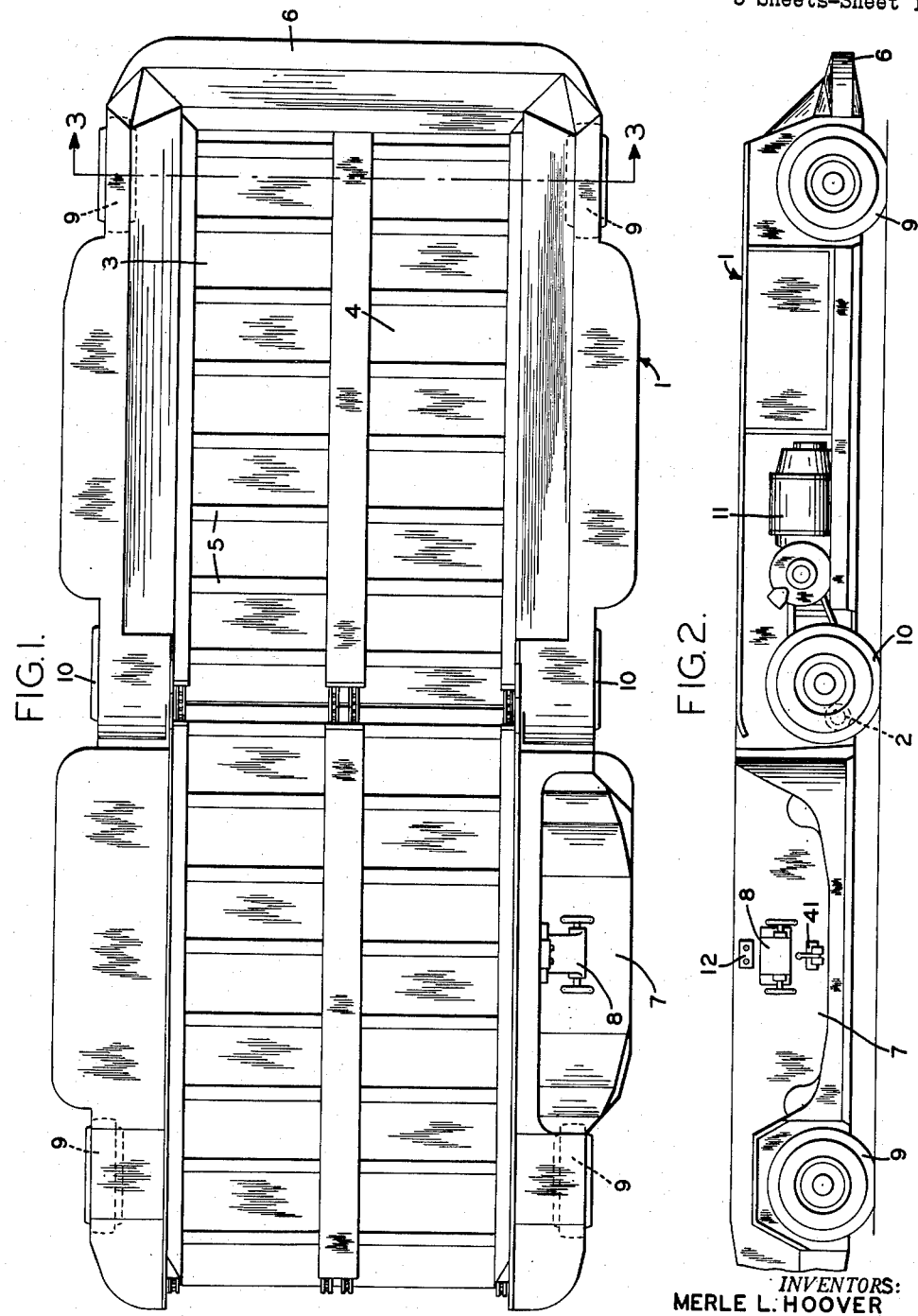
INVENTORS:
MERLE L. HOOVER
JAMES W. WOOLF
BY
Charles F. Osgood,
ATTORNEY.

Feb. 7, 1961 M. L. HOOVER ET AL 2,970,664
MINE HAULAGE VEHICLE
Filed June 9, 1958 5 Sheets-Sheet 2
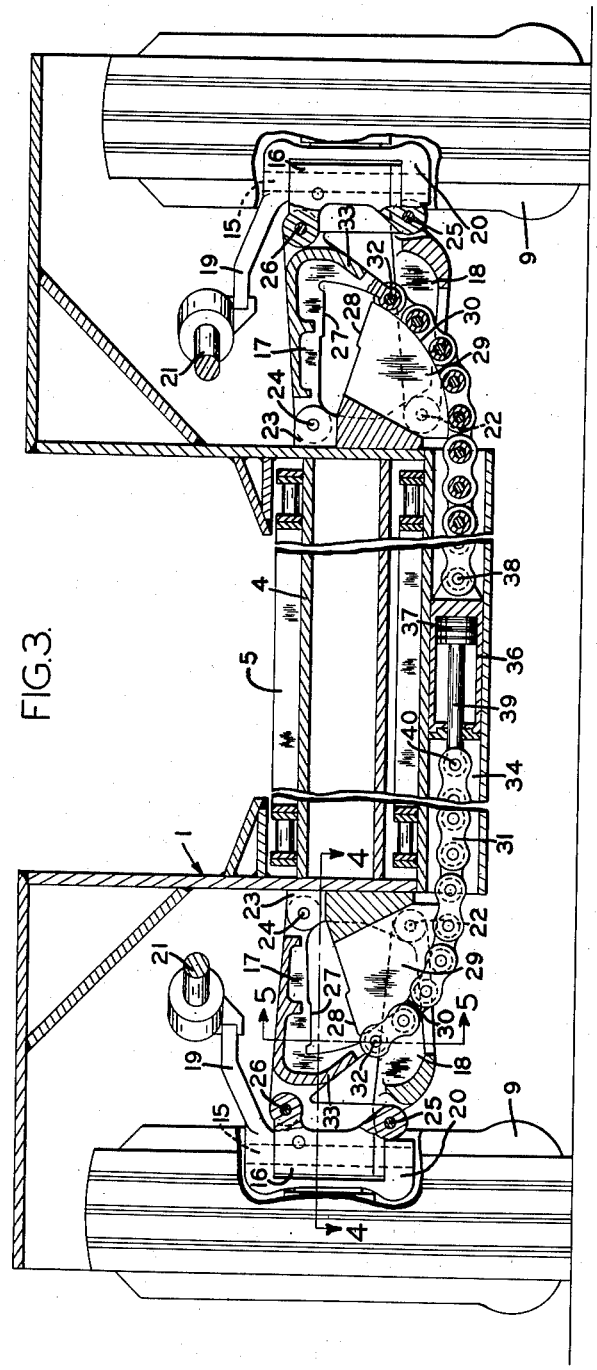
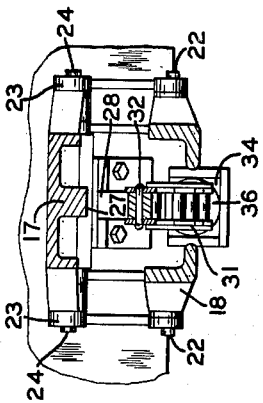
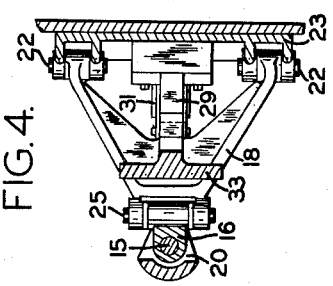
INVENTORS:
MERLE L. HOOVER
JAMES W. WOOLF
BY
ATTORNEY.

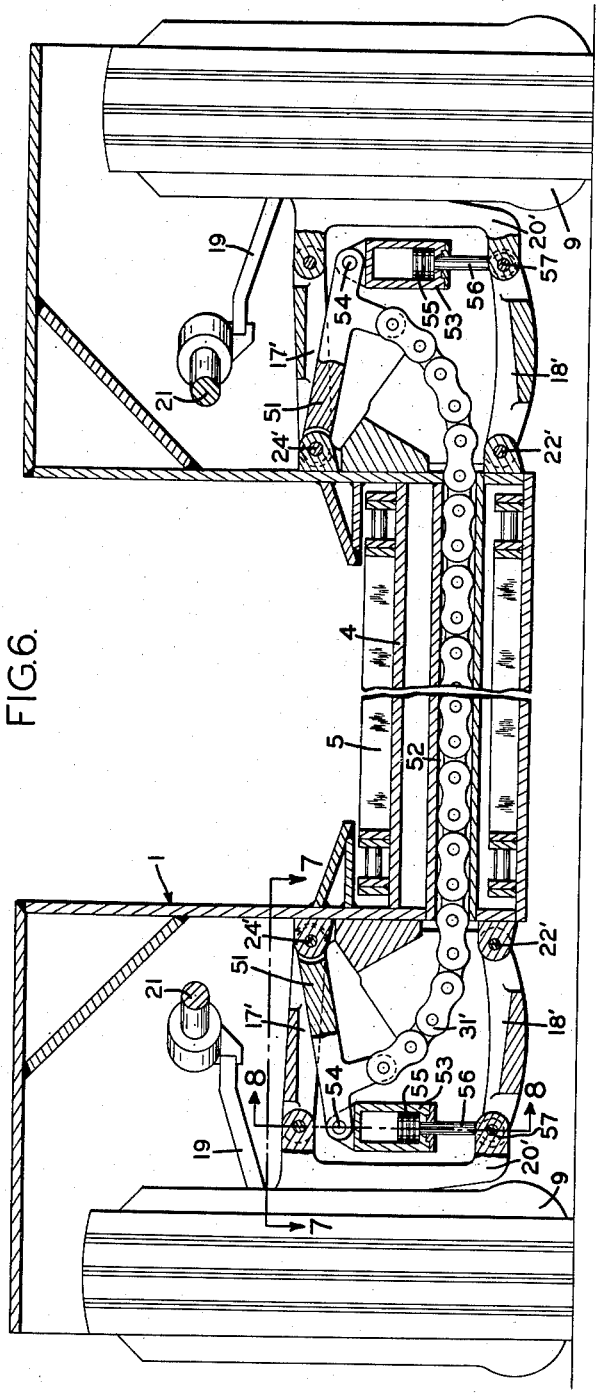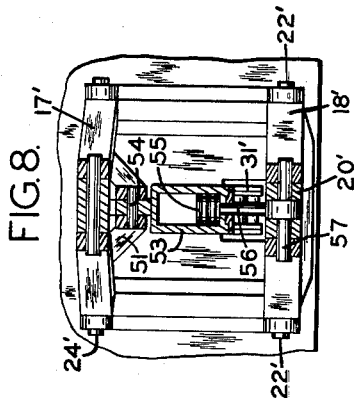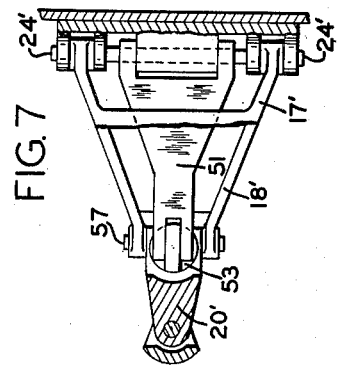

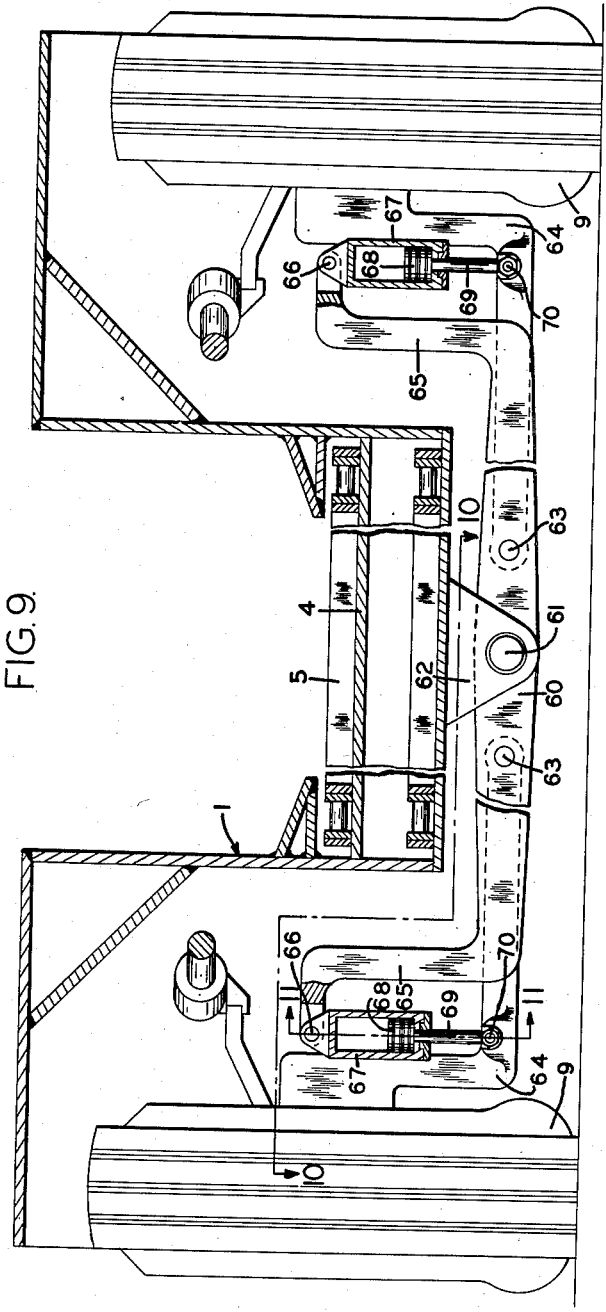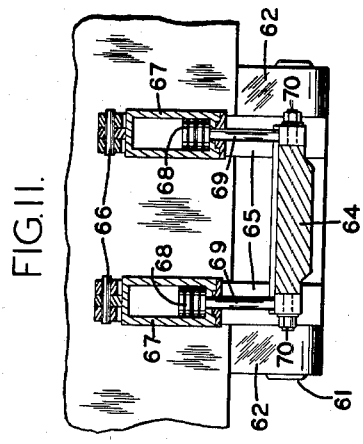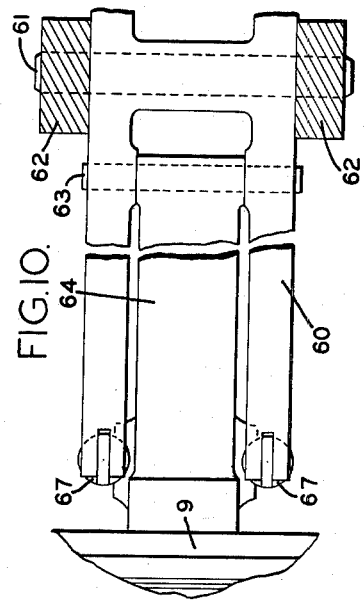

Feb. 7, 1961  M. L. HOOVER ET AL  2,970,664
MINE HAULAGE VEHICLE
Filed June 9, 1958  5 Sheets-Sheet 5

INVENTORS:
MERLE L. HOOVER
JAMES W. WOOLF
BY
ATTORNEY.

United States Patent Office 2,970,664
Patented Feb. 7, 1961

2,970,664

MINE HAULAGE VEHICLE

Merle L. Hoover and James W. Woolf, Franklin, Pa., assignors to Joy Manufacturing Company, Pittsburgh, Pa., a corporation of Pennsylvania Filed June 9, 1958, Ser. No. 740,829

13 Claims. (Cl. 180—41)

This invention relates to mine haulage vehicles and more particularly to a shuttle car of the wheel supported, propelled and steered type especially designed for use in underground mines having low headroom and having means for raising and lowering one or both ends of the car body relative to the wheels to vary the elevation thereof.

In conventional mine haulage vehicles commonly known as shuttle cars, particularly in low vein underground mining, it is often difficult properly to load the car due to the relatively restricted space usually present between the compartment bottom or rear deck and the mine roof in which space the discharge boom of the loading machine is positioned during the loading operation. In shuttle car design every effort is made to keep the space between the compartment bottom or rear deck and the mine roof as large as possible in vertical dimension by limiting the height of the compartment bottom or rear car deck as well as providing only the minimum necessary ground clearance below the car. Also it is desirable to elevate the front discharge end of the car body during unloading of the vehicle.

The present invention contemplates improvements over known types of shuttle cars in that it is made possible to elevate and lower or tilt the car body relative to the supporting wheels either to increase the space between the compartment bottom or rear deck and the mine roof during the loading operation and to raise the front discharge end of the car during the unloading operation.

An object of the present invention is to provide an improved mine haulage vehicle having improved means whereby the loading space between the rear car deck and the mine roof may be substantially increased during loading of the car. Another object is to provide an improved shuttle car having improved means for raising and lowering one or both ends of the car body to vary the elevation thereof. A further object is to provide an improved tilting means for the body of a shuttle car for lowering the loading end of the car to increase the loading space between the rear car deck and the mine roof. Yet another object is to provide improved elevating means for the car body operatively associated with the wheel suspension mechanism of the car. A still further object is to provide improved means for tilting the discharge end of the body of a shuttle car to increase the discharge height of the compartment bottom. Yet another object is to provide an improved hydraulically operated elevating and lowering means for one or both ends of a car body, with remotely located control valve means operable at will from the operator's station on the car. These and other objects and advantages of the invention will, however, hereinafter more fully appear.

In the accompanying drawings there are shown for purposes of illustration one preferred form and three modifications which the invention may assume in practice.

In these drawings:

Fig. 1 is a plan view and Fig. 2 is a side view of a shuttle car in which a preferred illustrative form of the invention is embodied.

Fig. 3 is an enlarged cross section taken on lines 3—3 of Fig. 1, showing one form of wheel suspension means with which the invention is operatively associated.

Fig. 4 is a detail horizontal section taken on line 4—4 of Fig. 3.

Fig. 5 is a detail vertical section taken on line 5—5 of Fig. 3.

Fig. 6 is a cross sectional view similar to Fig. 3, showing a modified construction.

Fig. 7 is a detail horizontal section taken on line 7—7 of Fig. 6.

Fig. 8 is a detail vertical section taken on line 8—8 of Fig. 6.

Fig. 9 is a cross sectional view similar to Fig. 6, showing another modification operatively associated with a different form of wheel suspension means.

Fig. 10 is a detail horizontal section taken on line 10—10 of Fig. 9.

Fig. 11 is a detail vertical section taken on line 11—11 of Fig. 9.

Figure 13:
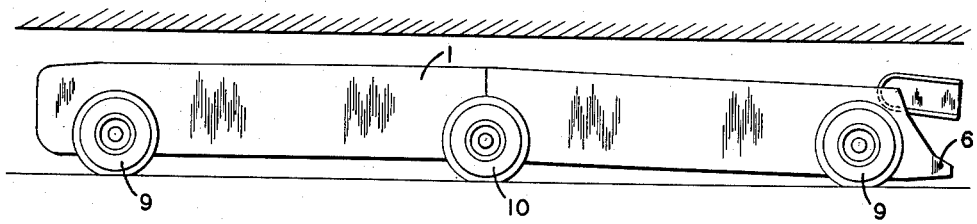
Fig. 13 is a diagrammatic side view showing the shuttle car of Figs. 1 to 5 inclusive in an underground mine passage with the car body at the rear loading end tilted downwardly.

In the several illustrative embodiments of the invention the shuttle car may be of the same general low height six-wheel articulated body type similar to that disclosed in a copending application to John D. Russell Serial No. 681,004, filed August 29, 1957, owned by the assignee of the present invention. The shuttle car comprises a generally rectangular car body 1 having body sections pivotally connected on a transverse axis, at 2, similar to the pivot structure as shown in Fig. 7 of the above mentioned John D. Russell application and providing a longitudinal material receiving compartment 3 extending throughout the length of the car body. The compartment has a bottom deck or floor 4 along which the top run of an endless flight conveyor 5 is guided for circulation. The rear receiving end of the car has a usual cross bumper 6 having its top surface merging into the rear deck or compartment bottom and over which the discharge boom of the loading machine is adapted to extend in the relatively restricted space between the rear deck and the mine roof, as shown in Fig. 13. An operator's station 7 is provided at one side of the car body, and control means 8 is operable from within the station for controlling the turning of the swivelled steering wheels 9 at the opposite end portions or sections of the car body. A pair of centrally located traction wheels 10 having their axes of rotation located near the axis of the body pivot 2 are suitably driven by motors 11 operatively connected to the traction wheels and a conventional motor control 12 is also located at the operator's station.

The wheel suspension means for the swivelled steering wheels 9, as in the embodiment disclosed in Figs. 1 to 5 inclusive, may be similar to that disclosed in a copending application to John R. Sibley Serial No. 681,-007, filed August 29, 1957, likewise owned by the assignee of the present invention. The steering wheel suspension means shown in Figs. 3, 4 and 5, within the limits of upward travel of the wheels 9, provides a cross equalizing arrangement between the steering wheels at each end of the car body. A pivot pin 15 of each swivelled steering wheel 9 is mounted in a vertical position in a housing 16 which housing is mounted for vertical up and down movement by upper 17 and lower 18 linkage or leverlike members arranged in the form of a parallelogram. Steering arms 19 of respective steering wheel pivot pin yokes 20 are pivotally connected to respective conventional type linkage means 21. The lower parallelogram linkage members 18 are pivotally mounted at 22 on frame members 23 secured to the opposite sides of the car body, for articulating movement in vertical planes perpendicular to the longitudinal plane sides of the car body. The upper parallelogram members 17 are likewise pivotally mounted at 24 on the frame members 23. The pairs of parallelogram linkage members 17 and 18 are pivotally hinged at their outer ends at the bottom at 25 and at the top at 26 respectively on the pivot pin housings 16. Each upper parallelogram member 17 is provided with a stop contact surface 27 which comes into abutment with a stop surface 28 on a chain guide bracket 29 to limit downward travel of the respective steering wheel 9. The chain guide brackets 29 have arcuate guiding surfaces 30 and each arcuate guide surface guides and directs suspension chain means 31 of the roller type from its pivotal end connection, at 32, with an arm 33 integral with the upper parallelogram linkage member 17 to a horizontal guiding chamber 34 arranged transversely across the bottom of the articulated sections of the car body. It will thus be seen that a suspension chain equalizing means is provided between the steering wheel mountings which absorbs and counteracts the upward thrust transmitted to the steering wheels 9, transmits this force across, and moves to maintain a dynamic balance between the two steering wheels to its connection at the respective end of the shuttle car. Evidently the wheel suspension means may assume other conventional forms.

Now referring to the preferred illustrative embodiment of the improved means for raising and lowering or tilting the rear loading end of the bar body, as shown in Figs. 1 to 5 inclusive, it will be noted that arranged in the transverse chain guiding chamber 34 at the rear end of the car body is an extensible power device herein desirably in the form of a fluid cylinder 36 containing a piston 37 and the cylinder is pivotally attached at 38 to one chain section of the cross chain means while the piston rod 39 is pivotally attached at 40 to the other cooperating chain section.

A control device 41, desirably in the form of control valve means, is arranged within the operator's station for regulating the fluid flow to the fluid cylinder 36 to effect relative movement between the cylinder and piston to lengthen the distance between the adjacent ends of the chain sections thereby to lower or tilt down the rear end of the car body relative to the wheels, as shown in Fig. 13, thereby to increase the space between the rear deck and top bumper surface and the mine roof. In this illustrative construction a fluid system, desirably a hydraulic system, is provided comprising a conventional motor driven pump 42 having its intake connected by a conduit 43 to a liquid reservoir or tank 44 and the discharge side of the pump is connected by a conduit 45 to the pressure passage of a valve box 46 containing a conventional manually shiftable control valve 47. The discharge side of this valve box is connected by a return conduit 48 back to the tank. Leading from the bore containing the control valve is a conduit 49 connected to the fluid cylinder 36 of the cylinder and piston device. When liquid is trapped in the fluid cylinder at the left hand side of the piston 37, as shown in Fig. 3, the car body is maintained in its elevated position and when fluid is vented from the cylinder the cylinder and piston move in relatively opposite directions to increase the length of the cross chain means to lower the car body. Fluid flow to the left hand end of the cylinder at the left hand surface of the piston (Fig. 3) effects raising of the car body back to its normal horizontal position. Evidently various forms of power operated mechanism may be operatively associated with the wheel suspension means to vary the elevation of the car body. A similar power device may be arranged in association with the wheel suspension means at the front end of the car body for elevating the discharge end of the car, as will hereinafter become apparent.

Figure 14:
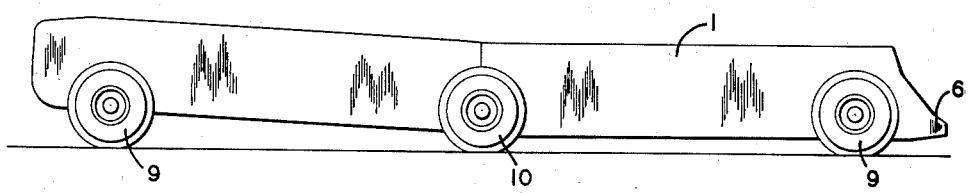
Fig. 14 is a diagrammatic view similar to Fig. 13, showing the car of Fig. 12 with the front discharge end tilted upwardly to increase the discharge height of the compartment-bottom.

In the modified construction shown in Figs. 6, 7 and 8 the parallelogram links 17' and 18' are pivotally mounted at 22' and 24' on brackets attached to the sides of the car body and additional vertically swingable pivoted links 51 are connected together by a single cross chain 31' which extends transversely through a horizontal guide chamber 52 extending across the car body at each end of the car. In this modified construction, upright fluid cylinders 53 are pivotally connected at 54 at their upper ends to the outer ends of the pivoted links 51 and these cylinders contain pistons 55 having downwardly extending piston rods 56 pivotally connected at their lower ends at 57 to pivot pin yokes 20'. The control means within the operator's station may be operated to effect discharge of fluid from the fluid cylinders 53 above the pistons 55 to lower the cylinders relative to the pistons thereby to cause the upper links 51 to swing downwardly about their pivotal connections with the sides of the car body. As the upper links swing downwardly the cross chain 31' has its end connections with the upper links lowered and moved somewhat closer together so that the loading end of the car body is allowed to tilt downwardly to decrease the overall height of the car thus to increase the space between the rear deck and the mine roof, as shown in Fig. 13. As the car body lowers the upper and lower links of the parallelograms swing downwardly about their outer pivotal connections with the wheel yokes 20' in an obvious manner. When pressure fluid is supplied to the upper ends of the cylinders 53 above the pistons 55 the links 51 are swung upwardly about their pivotal connections with the sides of the car body to pull up and slightly to move outwardly the ends of the cross chain 31' to elevate the car body. Otherwise this embodiment of the invention is similar to that above described. It will be evident that the fluid cylinders and pistons may be constructed to effect elevation of the discharge end of the car body from its horizontal position, as shown in Fig. 14.

In the modified embodiment shown in Figs. 9, 10 and 11 there is shown a conventional form of wheel suspension means comprising a standard transverse axle 60 pivotally connected midway between its ends on a horizontal longitudinally extending axis, at 61, to a bracket 62 secured to the bottom of the car body. Pivotally connected at 63 to the axle are leverlike steering wheel supports or arms 64 on which the steering wheels 9 are swivelly mounted by a housing and pivot pin structure similar to the form shown in Fig. 3. In this illustrative construction, the ends of the transverse axle are formed with upright angular portions 65 to which are pivotally connected at 66 fluid cylinders 67 containing pistons 68 having downwardly extending piston rods 69 pivotally connected at 70 to the leverlike wheel supports 64. As shown in Fig. 11, a pair of fluid cylinders 67 are arranged side by side at each end of the transverse axle between the latter and the leverlike wheel supports 64. In this construction the control valve means within the operator's station may be operated to control the liquid flow with respect to the fluid cylinders 67 to effect downward movement of the cylinders to lower the transverse axle to tilt downwardly the rear loading end of the car body. Otherwise this embodiment is similar to that disclosed in Figs. 6, 7 and 8.

Figure 12:
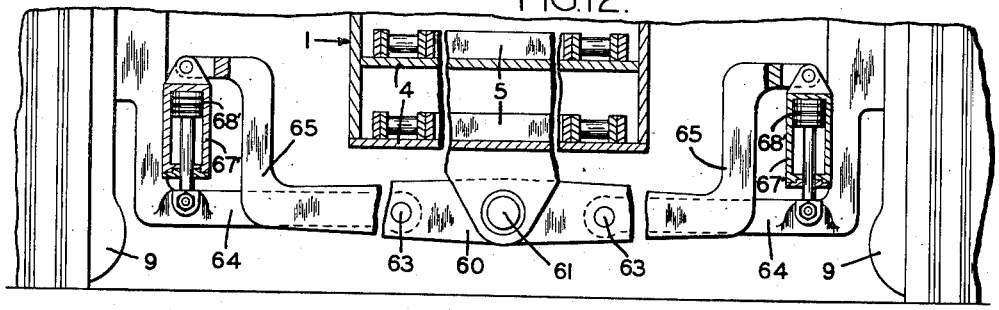
Fig. 12 is a fragmentary cross sectional view taken on the plane of Fig. 9, showing still another modification.

In the modification shown in Fig. 12 the cross suspension structure between the steering wheels is similar to that shown in Fig. 9. In this instance, however, the pistons 68' contained within the cylinders 67', when the car body is in its normal horizontal position, are located at the tops of the cylinders as shown. This modified arrangement is located at the front discharge end of the shuttle car so that when liquid under pressure is supplied to the upper ends of the cylinders above the pistons the cylinders are moved upwardly to raise the transverse axle 69 thereby to elevate or tilt upwardly the front discharge end of the car body, in the manner shown in Fig. 14. Otherwise this embodiment is similar to that shown in Fig. 9.

Figure 15:
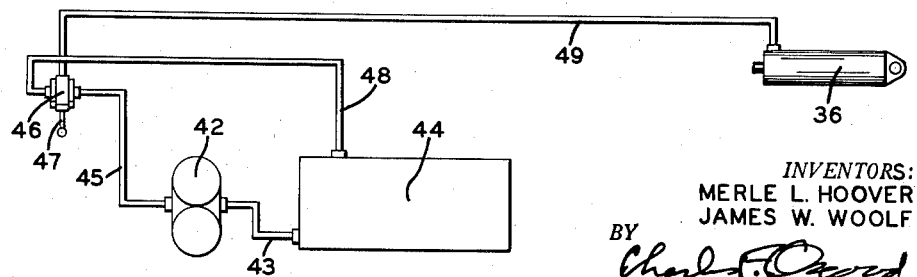
Fig. 15 is a diagram of the hydraulic control system of the preferred embodiment.

The hydraulic control system associated with the modified embodiments of the invention shown in Figs. 6, 9 and 12 is similar to that shown in Fig. 15 with the exception that, in the form shown in Fig. 6, the fluid conduit 49 leads to the pair of fluid cylinders 53 while in the forms of Figs. 9 and 12 the fluid conduit 49 leads to pairs of fluid cylinders 67 at the opposite sides of the car, and therefore further illustration of these modified hydraulic systems are deemed unnecessary.

As a result of this invention an improved mine haulage vehicle is provided having improved means for elevating and lowering or tilting one or both ends of the car body either to increase the clearance space between the rear deck of the car body and the mine roof or to raise the front discharge end of the car during the loading operation. By the provision of the improved power device or devices operatively associated with the steering wheel suspension means and the control means located within the operator's station it is possible to elevate or tilt one end or the other or both ends of the car body at the will of the operator. By the improved fluid cylinder and piston device or devices operatively associated with the suspension means for the steering wheels it is not only possible to make the elevating structure relatively simple but also extreme ruggedness and compactness are obtained. Other advantages of the invention will be clearly apparent to those skilled in the art.

While there are in this application specifically described one preferred form and three modifications which the invention may assume in practice, it will be understood that these forms and modifications of the same are shown for purposes of illustration and that the invention may be further modified and embodied in various other forms without departing from its spirit or the scope of the appended claims.

What we claim as new and desire to secure by Letters Patent is:

1. In a mine haulage vehicle, a vehicle body having articulated body sections pivotally connected together substantially midway between the ends of the vehicle, a material receiving compartment extending along said sections lengthwise of said body, steering wheels at the ends of the vehicle body, respectively, traction wheels intermediate said steering wheels near the pivotal connection between the body sections, and means operatively associated with the steering wheels and a section of the vehicle body for tilting said section relative to the said steering wheels and the other body section to vary the elevation of the outer end thereof.

2. A mine haulage vehicle as set forth in claim 1 wherein remote control means is provided at an operator's station on the vehicle whereby said tilting means may be controlled at the will of the operator.

3. In a mine haulage vehicle, a vehicle body having articulated body sections pivotally connected together substantially midway between the ends of the vehicle on a transverse axis, supporting wheels at the ends of the vehicle body for supporting the pivotally connected body sections and means operatively connected between said supporting wheels and a section of the vehicle body for tilting said section about the pivotal connection of the other body section.

4. A mine haulage vehicle as set forth in claim 3 wherein remote control means is provided at an operator's station on the vehicle for controlling said tilting means at the will of the operator.

5. In a mine haulage vehicle for use in underground mines having low headroom, a relatively low height elongated body having a material receiving compartment extending longitudinally along its length, said body comprising elongated sections pivotally connected between their ends, wheeled supporting means for said body comprising end wheeled mountings for normally supporting said body in a horizontal position while said wheels are supported by a horizontal floor surface of a mine, power operated means operatively connected to an element of the wheel mounting at the load receiving end of the vehicle for moving said body to lower the load receiving end of said body below said normal horizontal position to increase the clearance between said load receiving end of said body and the mine roof during loading of said body, and control means operable for effecting operation of said power operated moving means.

6. A mine haulage vehicle as set forth in claim 5 wherein the vehicle has an operator's station near the end of said body section remote from said receiving end and said control means has a control element operable from within the operator's station.

7. In a mine haulage vehicle, a vehicle body having articulated body sections pivotally connected together substantially midway between the ends of the vehicle on a transverse axis, steering wheels at the respective ends of the vehicle body, support means for supporting said body extending laterally thereof and between said steering wheels, said support means including a member extending transversely of and beneath said body and power devices between said support means and said wheels whereby operation of said power devices on one section causes tilting of said section relative to the other section to vary the elevation of the outer end of said one section relative to said wheels, and means on one of said sections for controlling said power devices.

8. In a mine haulage vehicle as set forth in claim 7 wherein means is provided on the other of said sections for controlling said power devices.

9. In a mine haulage vehicle as set forth in claim 7 wherein power operated devices are provided for tilting the other end of said body.

10. In a mine haulage vehicle, a vehicle body having articulated body sections pivotally connected together substantially midway between the ends of the vehicle, a material receiving compartment extending along said sections lengthwise of said body, steering wheels at the ends of the vehicle body respectively, traction wheels intermediate said steering wheels near the pivotal connection between the body sections, and means operatively associated with the steering wheels and a section of the vehicle body for tilting said section relative to the said steering wheels on said section and the other body section to vary the elevation of the outer end thereof.

11. In a mine haulage vehicle, a vehicle body having articulated body sections pivotally connected together substantially midway between the ends of the vehicle, a material receiving compartment extending along said sections lengthwise of said body, steering wheels at the ends of the vehicle body respectively, traction wheels intermediate said steering wheels near the pivotal connection between the body sections and means operatively associated with the steering wheels and a section of the vehicle body for tilting said section about the axes of said traction wheels to vary the elevation of the outer end thereof.

12. In a mine haulage vehicle for use in underground mines having low headroom, a relatively low height elongated body having a material receiving compartment extending longitudinally along its length, said body comprising elongated sections pivotally connected between their ends, wheeled supporting means for said body comprising end wheeled mountings for normally supporting said body in a horizontal position while said wheels are supported by a horizontal floor surface of a mine, power operated means having one portion operatively connected to an element of the wheel mounting at the load receiving end of the vehicle for moving said body to lower the load receiving end of said body below said normal horizontal position to increase the clearance between said load receiving end of said body and the mine roof during loading of said body, upper and lower link elements, said link elements each pivotally connected at their inner ends to the vehicle body, said lower link elements pivotally connected at their outer ends to the wheel mountings respectively and the outer ends of the upper link elements each pivotally connected to another portion of said power operated means, a support element extending transversely of said body between said wheel mountings, the ends of said support element pivotally connected respectively to said upper link elements, and control means operable for effecting operation of said power operated means.

13. In a mine haulage vehicle, a vehicle body having aritculated body sections pivotally connected together substantially midway between the ends of the vehicle on a transverse axis, steering wheels at the opposite end portions of the vehicle body, support means for supporting said body extending laterally thereof and between said steering wheels, said support means including a member extending transversely of and beneath said body and power devices between said support means and said wheels whereby operation of said power devices on one section causes tilting of said section relative to the other section to vary the elevation of the outer end of said one section relative to said wheels on said one section, and means on one of said sections for controlling said power devices.

References Cited in the file of this patent

UNITED STATES PATENTS

| | | |
|---|---|---|
| 2,325,731 | Arentzen | Aug. 3, 1943 |
| 2,378,892 | Arentzen | June 26, 1945 |
| 2,694,581 | Helmle | Nov. 16, 1954 |
| 2,770,377 | McCallum | Nov. 13, 1956 |
| 2,849,225 | Lucien | Aug. 26, 1958 |
| 2,853,308 | Schramm | Sept. 23, 1958 |
| 2,901,051 | Thibobeau | Aug. 25, 1959 |

FOREIGN PATENTS

| | | |
|---|---|---|
| 616,929 | Great Britain | Jan. 28, 1949 |